United States Patent
Ito

[11] Patent Number: 6,139,236
[45] Date of Patent: Oct. 31, 2000

[54] BOARD ANCHOR

[75] Inventor: Katsuo Ito, Sapporo, Japan

[73] Assignee: Koyo Kizai Co., Ltd., Sapporo, Japan

[21] Appl. No.: 09/354,754

[22] Filed: Jul. 29, 1999

[51] Int. Cl.[7] .................................................. F16B 13/04
[52] U.S. Cl. ...................... 411/30; 411/80.1; 411/387.1; 411/419; 408/223
[58] Field of Search ..................... 411/29, 30, 80.1–80.6, 411/57.1, 60.1–60.3, 55, 419, 387.1–387.8; 408/223, 224, 227

[56] References Cited

U.S. PATENT DOCUMENTS

| | | | |
|---|---|---|---|
| 1,138,219 | 5/1915 | Hottenroth | 411/80.1 |
| 3,482,482 | 12/1969 | Sage | 411/80.1 |
| 5,160,225 | 11/1992 | Chern | 411/30 |
| 5,692,864 | 12/1997 | Powell | 411/419 |

FOREIGN PATENT DOCUMENTS

| | | | |
|---|---|---|---|
| 2602283 | 7/1977 | Germany | 411/80.1 |
| 2171481 | 8/1986 | United Kingdom | 411/80.1 |

*Primary Examiner*—Flemming Saether
*Attorney, Agent, or Firm*—Irving Keschner

[57] ABSTRACT

An anchor that screws directly into a board without requiring a tap drill hole. A male screw is provided around the shaft part of the anchor with a drill part at one end and a flange part at the other end; at the end where the flange part is provided, a turning tool engagement hole and a female screw formed hole part continuous therewith are provided. The drill part is formed into a tapered-pyramid shape, multiple split shaft parts being formed by providing a slit that extends from the end surface of the pyramid-shaped drill part to midway up the shaft part. The tip of the split shaft part incorporate connected multiple drill bits that are formed by splitting the pyramid-shaped drill part.

2 Claims, 2 Drawing Sheets

BOARD ANCHOR

BACKGROUND OF THE INVENTION

1. Field of the Invention

The present invention relates to a board anchor used to mount and fasten various materials to a wall composed of a fragile material.

2. Description of the Prior Art

Conventional board anchors such as those disclosed in Japanese Utility Model Registration No. 300632, Japanese Utility Model Application Kokai No. 63-16212, and Japanese Patent Application Publication Jitsu Kai Shou No. 3-525) show a male screw provided around the shaft part, having a drill part at one end and a flange part at the other end. At the tip of said flange part is provided a turning tool engagement hole and a female screw formed hole part continuous therewith. Mounting is performed by screwing the mounting screw into the female screw formed hole part. The user only needs to screw the anchor into the board, thereby causing the drill part to form a tap drill hole in the board, whereby a separate tap drill hole step is not required. Next, the anchor is screwed into the board by screwing the male screw of the shaft part into the tap drill hole.

In the case of the conventional board anchors, however, the drill parts are formed into a flat-pyramid-shaped, flat drill cutting tool, so not only is the resistance great when boring the tap drill hole, but the tap drill hole easily becomes crooked. As a result, the board anchor is screwed crookedly into the board.

SUMMARY OF THE PRESENT INVENTION

The present invention provides a board anchor that solves the aforementioned problems associated with conventional board anchors.

In particular, the board anchor of the present invention is configured such that a male screw is provided around a shaft part with a drill part at one end and a flange part at the other end; at the end where the flange part is provided, a turning tool engagement hole and a female screw formed hole part continuous therewith are provided. Mounting is performed by screwing the mounting screw into the female screw formed hole part; the drill part is formed into a tapered-pyramid shape. Multiple split shaft parts are formed by providing a slit that extends from the end surface of the pyramid-shaped drill part to midway up the shaft part. The tip of the split shaft part incorporate connected multiple drill bits that are formed by splitting the pyramid-shaped drill part. When a tap drill hole is bored by pushing the tips of the drill bits into a board, the opposing drill bits are displaced in opposite directions, thereby providing a drilling action.

The tip surfaces of the drill bits are formed into small flat surfaces orthogonal to the axis. As the mounting screw is screwed into the female screw formed hole part, the multiple split parts deform into a open-legged shape. The slit preferably is provided diagonally relative to the pyramid-shaped drill part, but it also may be provided perpendicularly relative to the sides. Multiple slits also may be provided. Preferably, the pyramid-shaped drill part has a quadrangular pyramid shape.

DESCRIPTION OF THE DRAWING

For a better understanding of the invention as well as other objects and further features thereof, reference is made to the following description which is to be read in conjunction with the accompanying drawings wherein.

DESCRIPTION OF THE INVENTION

Figure 1:
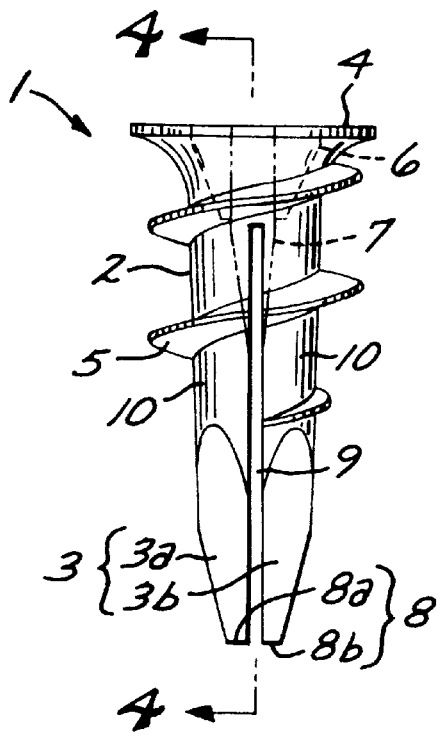
FIG. 1 a front elevation view of the board anchor of the present invention.
Figure 2:
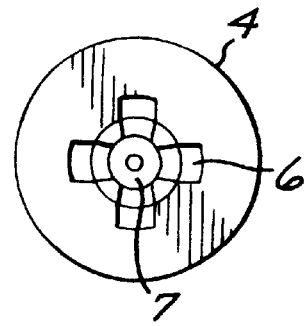
FIG. 2 is a plan view of the board anchor shown in FIG. 1.
Figure 3:
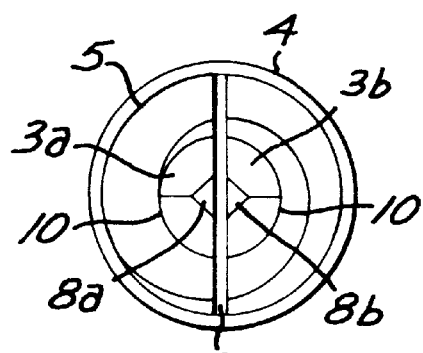
FIG. 3 is the bottom view of the board anchor shown in FIG. 1.
Figure 4:
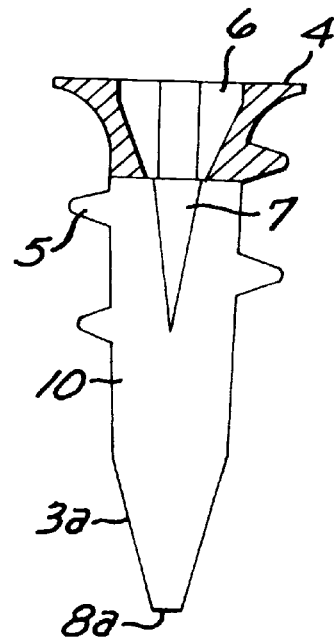
FIG. 4 is a cross-sectional view along line 4—4 of FIG. 1.

FIGS. 1 to 4 show the board anchor 1 of the present invention. Anchor 1 comprises shaft portion 2, which has drill part 3 at one end and flange part 4 at the other end, and is provided with male screw 5, having a wide pitch and a high screw thread. At the flange part 4 end are provided both Phillips hole 6, into which fits a Phillips screwdriver, as well as female screw formed hole 7 that continues to the said Phillips hole 6 and extends toward the drill part 3. Drill part 3 is formed into a tapered-quadrangular-pyramid shape. The tip surfaces 8 of the pyramid-shaped drill part 3 have small areas and are formed into flat surfaces orthogonal to the axis of the shaft part 2. Slit 9, which extends along the axis of the shaft portion 2 from the tip surfaces 8 to the female screw formed hole part 7, is provided diagonally relative to the quadrangular drill part 3. Slit 9 forms two split leg parts 10, 10 in shaft portion 2, and the two drill bits 3a, 3b formed by diagonally splitting the pyramid-shaped drill part 3 form the tip parts of both split legs parts 10, 10. The cross-sectional shape of both drill bits 3a, 3b is a triangular pyramid shape, and the split tip surfaces 8a, 8b form small, triangular flat surfaces.

Figure 5A:
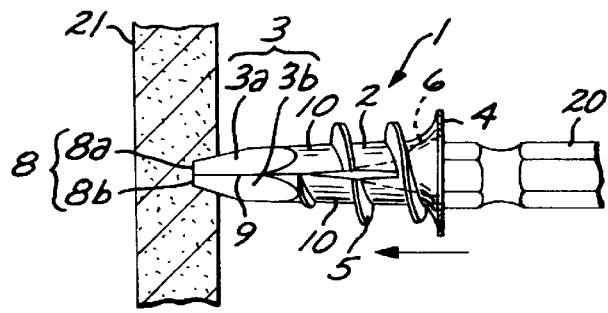
FIGS. 5(a)–5(d) illustrate how the board anchor of the present invention is utilized.
Figure 5B:
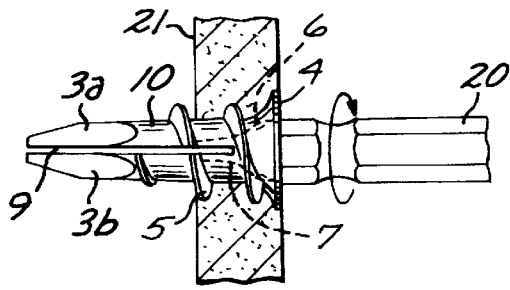
Figure 6:
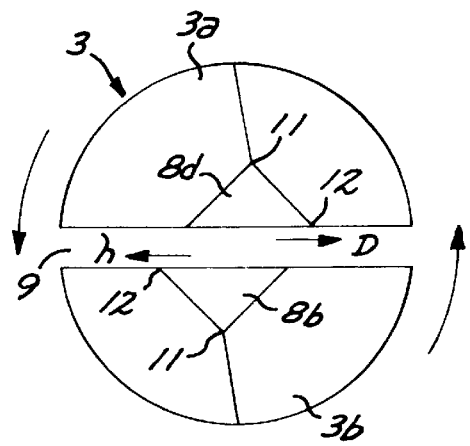
FIG. 6 is an enlarged plan view showing the pyramid-shaped tip part when a tap drill hole is formed in the board by means of the pyramid-shaped drill part.

FIGS. 5(a)–5(b) show how the board anchor 1 is used, and in particular, how the fastening of mounted element 22 to gypsum board 21 is accomplished. In particular, the bit of Phillips screwdriver 20 initially engages the Phillips hole 6 of the anchor 1. The tip surfaces 8a and 8b of both drill bits 3a and 3b of the anchor 1 are pushed into the desired position of the board 21, after which the Phillips screwdriver 20 is used to screw in the anchor 1. At this time, the tip surfaces 8a and 8b of both drill bits 3a and 3b are formed into flat surfaces with small triangular shapes, so they push straight into the board 21. The tip parts of both drill bits 3a and 3b are twisted by the resistance force accompanying the rotation of the anchor 1. As indicated by arrows a and b in FIG. 6, they are displaced in opposite directions relative to each other. As a result of this displacement, the two corners 11 and 12 of both drill bits 3a and 3b function as drill cutting tools, thereby boring a tap drill hole in the board 21. The tap drill hole formed by both drill bits 3a and 3b is bored very smoothly and rapidly by the four corners 11, 11 and 12, 12. Moreover, a nearly perfect circle is formed straight into in the board 21, with no burrs. The male screw 5 of the anchor 1 screws into the inner surface of the tap drill hole formed in this manner. The conical drill part 3 projects from the back side of the board 21, and the anchor 1 is fastened to the board 21, with the flange part 4 flush with the surface of the board 21 (see FIGS. 5(a) and 5(b)). In this manner, the anchor 1 is mounted by simply screwing it directly into the board 21, without preparing a tap drill hole.

Figure 5C:
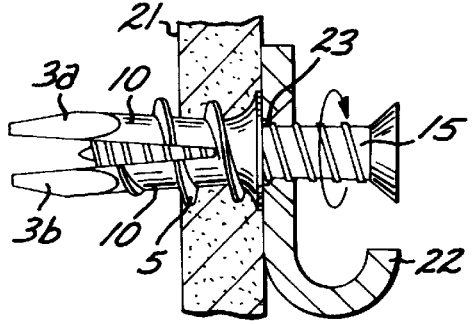
Figure 5D:
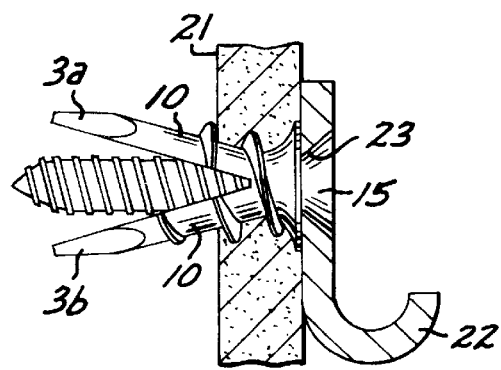

Next, as shown in FIG. 5(c), the mounting screw 15 pushed through the hole 23 of the mounted element 22 is inserted into the female screw formed hole part 7 from Phillips hole 6 of the anchor 1, and the screwing action secures the mounted element 22 to the board 21 by means of the mounting screw 15. Also, as shown in FIG. 5(d), as the mounting screw 15 screws in, both split legs 10, 10 of the shaft part 2 are forced apart by the screw 15. The male screw 5 cuts into the board 21, so the entire anchor 1 is more firmly fastened to the board 21. Furthermore, the openness of both split legs 10, 10 increases with the outside diameter of the mounting screw 15 screwed into the anchor 1, which is convenient.

In the preferred embodiment, slit 9 is provided diagonally along the pyramid-shaped drill part 3, but it also may be provided perpendicularly relative to the sides. Furthermore, multiple slits 9 may be provided. Also, although the preferred shape of the pyramid-shaped drill part 3 is a quadrangular pyramid, it also may be a triangular, pentagonal or hexagonal pyramid.

The board anchor of the present invention requires no preparation of a tap drill hole in the board, so it is possible to secure a device by screwing the anchor directly into the board. A particularly remarkable effect is exhibited in the following instance. The drill part provided at one end of the anchor's shaft portion is formed into a tapered-pyramid shape. A slit that extends from the tip surface of the pyramid-shaped drill portion to midway up the said shaft part is provided, thereby forming multiple split shaft portions. At the tips of the split shaft parts are connected multiple drill bits that are formed by splitting the said pyramid-shaped drill part. The tip surfaces of the drill bits bore a tap drill hole by pushing into the board. At this time, the opposing drill bits are displaced in opposite directions, thereby exhibiting superior drilling functionality. As a result, a tap drill hole is formed easily and rapidly in the board, so it is possible to rapidly and correctly screw the anchor into the board.

While the embodiment has been described with reference to its preferred embodiment, it will be understood by those skilled in the art that various changes may be made and equivalents may be substituted for elements thereof without departing from the true spirit and scope of the invention. In addition, modifications may be made to adapt a particular situation or material to the teachings of the invention without departing from its essential teachings.

What is claimed is:

1. A board anchor having a longitudinal axis for mounting an item to a board member comprising a shaft portion with a drill portion on one end and a flange part at the other end; a turning tool engagement hole and a female screw formed hole part continuous therewith at the flange portion end, said drill portion formed into a tapered-pyramid shape; a slit extending from the end surface of the said pyramid-shaped drill portion to midway up said shaft portion; multiple drill bits thereby being formed at the tip of said split shaft portion; a tap drill being formed by pushing the tips of the said drill bits into said board member, opposing drill bits being displaced in opposite directions, thereby providing a drilling action in said board member.

2. The board anchor set forth in claim 1 wherein the tip portions of each of said multiple drill bits are formed into flat surfaces substantially orthogonal to said longitudinal axis.

* * * * *